United States Patent [19]

Chen

[11] Patent Number: 4,711,366
[45] Date of Patent: Dec. 8, 1987

[54] PRESSURE COOKER

[76] Inventor: Shin-I Chen, No. 5 Lane 102 Ho-Chiang Street, Taipei, Taiwan

[21] Appl. No.: 890,167

[22] Filed: Jul. 28, 1986

[51] Int. Cl.$^4$ .............................................. B65D 45/34
[52] U.S. Cl. ................................... 220/316; 220/321; 99/325; 99/337; 99/369
[58] Field of Search ...................... 220/316, 321, 319; 99/325, 337, 369; 292/256.65

[56] References Cited

U.S. PATENT DOCUMENTS

| 2,237,952 | 4/1941 | Smith | 220/321 |
| 3,029,724 | 4/1962 | Lee | 220/320 |
| 4,294,377 | 10/1981 | Chen | 220/320 |
| 4,299,331 | 11/1981 | Bertola | 220/316 |
| 4,396,130 | 8/1983 | Robinson | 220/316 |
| 4,470,515 | 9/1984 | Boehm | 220/316 |

Primary Examiner—Stephen Marcus
Assistant Examiner—Nova Stucker
Attorney, Agent, or Firm—Asian Pacific International Patent & Trademark Office

[57] ABSTRACT

A pressure cooker which uses an elastic C-connector to fix a cover to a cooker body in airtight manner. Loosening and tightening of the C-connector are controlled by an operating handle. The operating handle has a relief valve at one end. The relief valve has a valve body and an adjustable valve rod so that when the C-connector is in tightening condition, the valve body is located on a valve seat on the cover. Pressure can be relieved through the relief valve or edge of the C-connector after it reaches a certain level. Pressure in the cooker will raise two safety pins to restrict movement of a rod so that removal of the valve body from the valve seat is impossible and thus removal of the cover is prevented for safe operation.

1 Claim, 6 Drawing Figures

PRESSURE COOKER

BACKGROUND OF THE INVENTION

The present invention relates to a pressure cooker, particularly one which may have its cover opened only when the pressure in it has fallen to a safe level.

A pressure cooker can form an air-tighted space in a cooker body by an airtight connection between cooker body and cover so that the temperature and the pressure in the cooker can rise rapidly for shortening the cooking time. The cover may be removed only after lowering the pressure through a relief valve.

Seals between a cooker body and a cover as well as relief valve mechanism are quite reliable after experiencing improvements for many years. However, some safety problems still exist, such as:

(1) When food of a high expansion coefficient is cooked in a pressure cooker, the food expands quickly and particles may clog the relief valve before the relief valve functions. Then, high pressure in the cooker may cause explosion, or cause injury to persons when its cover is opened. Putting an excessive quantity of food in a pressure cooker may also cause hazards. Imperfect safety design of the conventional pressure cooker is a main cause of accidents arising in the use of a pressure cooker.

(2) One known relief valve of the conventional design begins when the pressure relief only pressure in the cooker reaches a certain level. It does not give a restriction to the timing of cover opening. Therefore, the cover of the pressure cooker may be opened before pressure is lowered to a safe level, and thus, an accident may occur.

(3) Air-tightness and high pressure resistance are required in the connection between a cooker body and its cover. Therefore, the conventional pressure cooker is usually very heavy and not convenient in use.

U.S. Pat. No. 2,237,952 granted to Smith on Apr. 8, 1941 is for an arrangement of leakproof cover and ring seal for forming a closed space in a cooker in order to improve thermal efficiency and rapidly raise the temperature and pressure in the cooker, but it has the following defects: (1) there is no way to prevent opening of its cover under high pressure, and the cover must be opened very carefully to avoid an accident; (2) its structure is complicated and it is heavy; and (3) its relief valve is not a good safety device.

U.S. Pat. No. 3,029,724 granted to Lee on Apr. 17, 1962 discloses a pressure cooker which uses a clamping means to fix or release a lid means and a containers so that an air-tight space can be formed in the container. Its design includes a pressure gauge and a safety valve on the lip means. However, it has the following defects: (1) the safety valve could be out of order due to clogging of a highly expandable food in the cooker; and (2) there is no way to prevent opening of the lip means when there is a high pressure in the cooker.

U.S. Pat. No. 4,294,377 granted to the inventor on Oct. 13, 1983 discloses a constant pressure cooker and fastener to eliminate the possibility of relief valve clogging. It uses a elastic coupling steel ring to fit a cover and a cooker body in order to form an air-tight space in the cooker. Thus it has many merits, it does not any way prevent opening of the cooker when there is a high pressure in the cooker. Furthermore, due to limit of the elasticity of the coupling steel ring, pressure in the cooker will be relieved even at a level which is quite high.

Therefore, there is a need for safety measures to preclude opening of pressure cooker at high pressure and a need for a relief valve which can relieve pressure to a safe level. An alternate way of pressure relief is desirable too.

SUMMARY OF THE INVENTION

The main objective of the present invention is to provide a pressure cooker with reliable safety device to prevent accidents bring caused by improper operation.

The other objective of the present invention is to provide a pressure cooker which has a means to prevent its opening when there is high pressure in the cooker to assure safety of the operator.

The other objective of the present invention is to provide a pressure cooker with two different means for pressure relief alone or jointly in order to lower the pressure in the cooker to a safe level.

For achievement of the above objectives, the present invention uses an elastic C-connector which tightly fits the cooker body and its cover. Closing and opening of the C-connector is controlled by an operating handle connected to an opening of the C-connector. Another end of the operating handle incorporates a relief valve composed of a valve body and an adjustable valve rod. When the operating handle is pushed to close the C-connector, the valve body of the relief valve is placed on a valve seat at the cover. As soon as pressure in the cooker reaches a certain level, pressure is relieved through the relief valve or edge of the C-connector. Safety pins on the cover rise whenever there is pressure in the cooker so that a rod across the valve body is restricted from movement and then removal of the valve body from the valve seat is impossible. Thus opening of the cooker is prevented, and a safe operation is assured.

The C-connector has an opening, each of its end has an extension plate, at which the center shaft of a grooved cam is mounted. The extension plates are slidingly fitted to the center shaft. The grooved cam is connected to the operating handle so that an upward pulling of the operating handle will drive the grooved cam to rotate, the extension plates contact with each other gradually by guiding via two symmetrical guiding slots so that the cover is tightly fitted to the cooker body. To the contrary, downward pulling of the operating handle will separate the entension plates and disengage the cover from the cooker body.

In case the relief valve which has a plurality of ventilating holes is clogged by highly expandable or excessive food in the cooker, pressure accumulated in the cooker can be relieved at the edge of the C-connector so that pressure will not be excessively accumulated in the cooker and risk of explosion is avoided.

In conclusion, the present invention has the following features and effects:

(1) It has a relief valve for normal pressure relief and a C-connector for auxiliary pressure relief. Failure of the relief valve will not prevent the C-connector from pressure relieving, and thus the possiblity of explosion is eliminated.

(2) It is impossible to push the operating handle downward for removal of the C-connector and opening of cooker before pressure in the cooker has fallen to a safe level, and thus injury by high pressure and temperature upon opening of the cooker can be prevented.

(3) Moving of the operating handle and screwing-in of the valve body of the relief valve meet the requirement of ergonomic engineering, and operation of them is easy and effort-saving.

(4) The cooker can be used as a common cooker after removing the C-connectorm and thus its scope of use is greatly extended. In other words, it can be used as a pressure cooker and as a common cooker.

BRIEF DESCRIPTION OF THE DRAWINGS

Other objectives and merits of the present invention are described below, with referent to the attached drawings which are referring to a preferred embodiment of the present invention.

DETAILED DESCRIPTION

Figure 1:
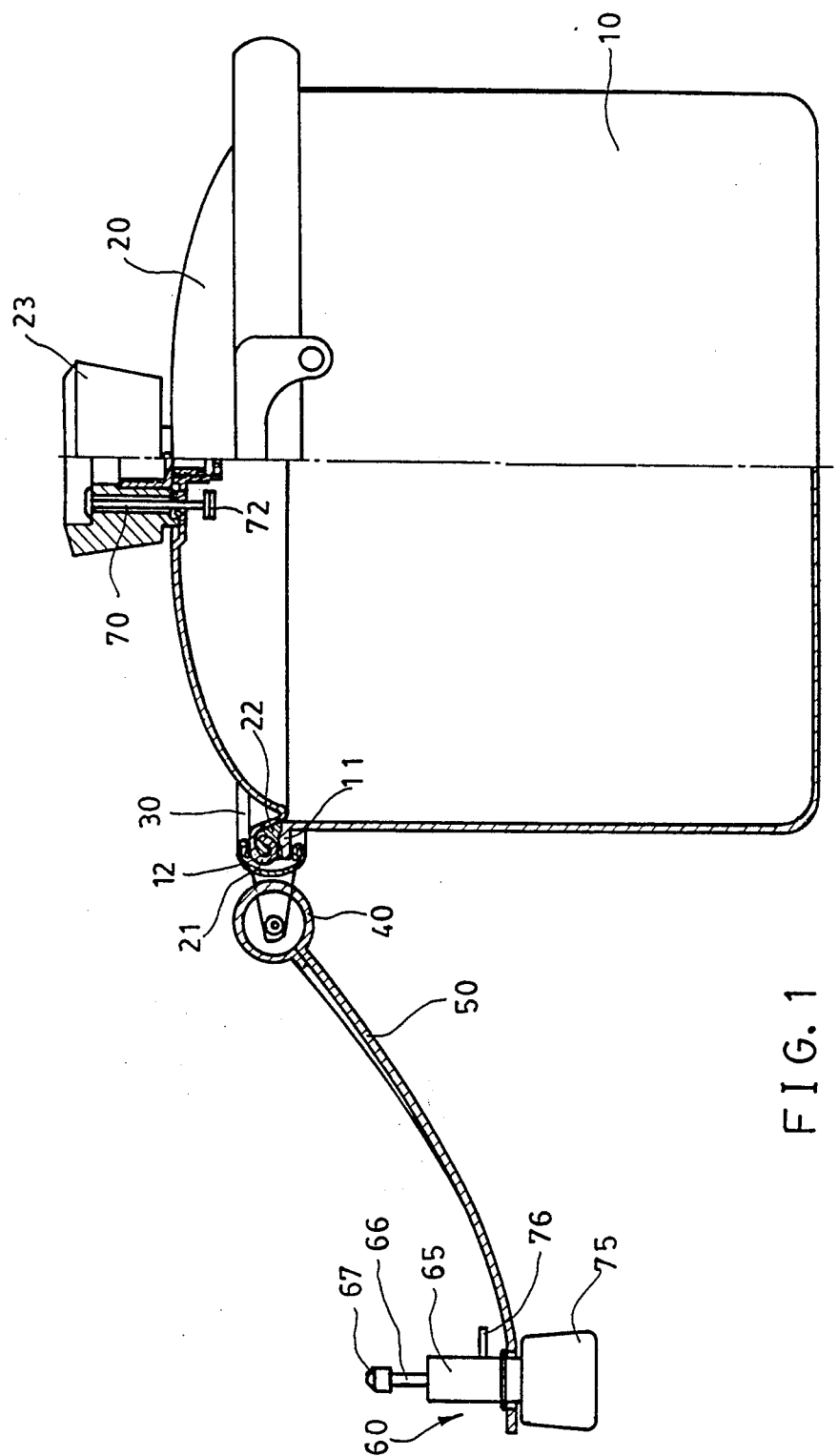
FIG. 1 is a partial sectional view of the present invention before a cooking procedure.
Figure 2:
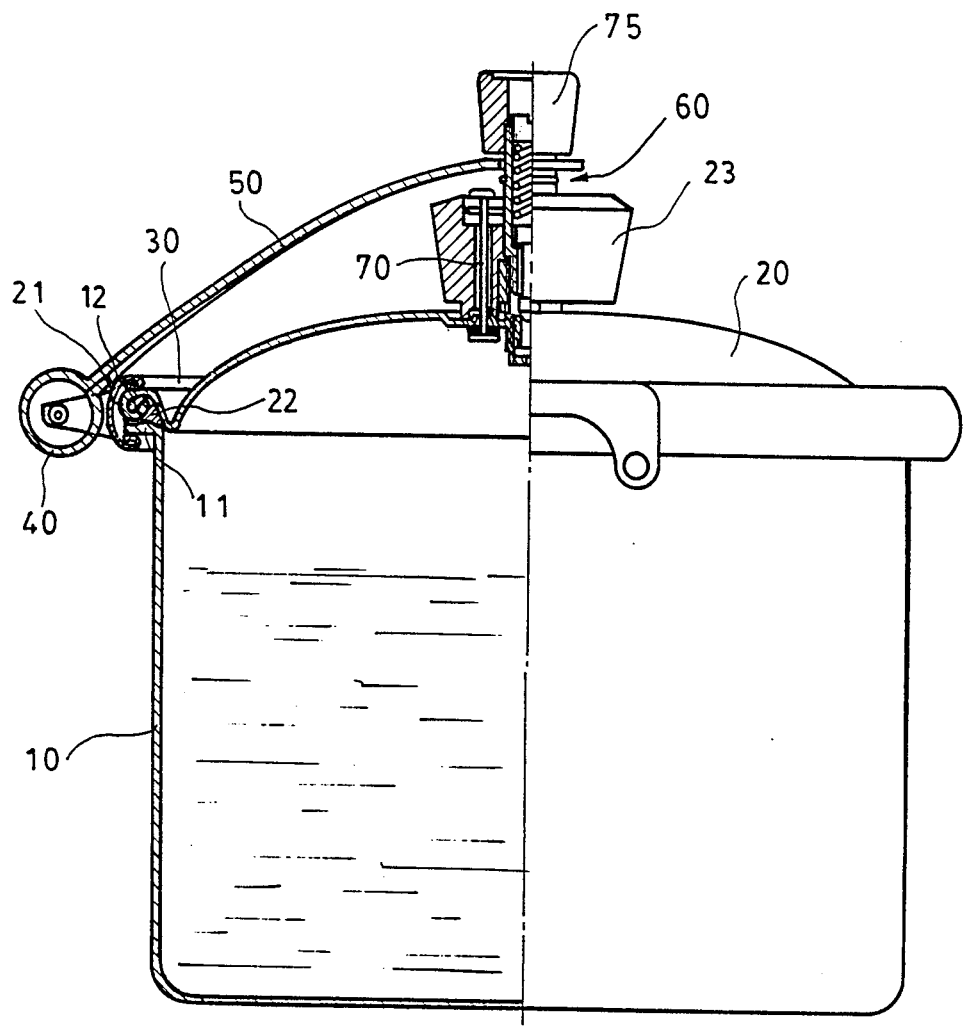
FIG. 2 illustrates assembly of the present invention which is ready to proceed with a cooking procedure.
Figure 3:
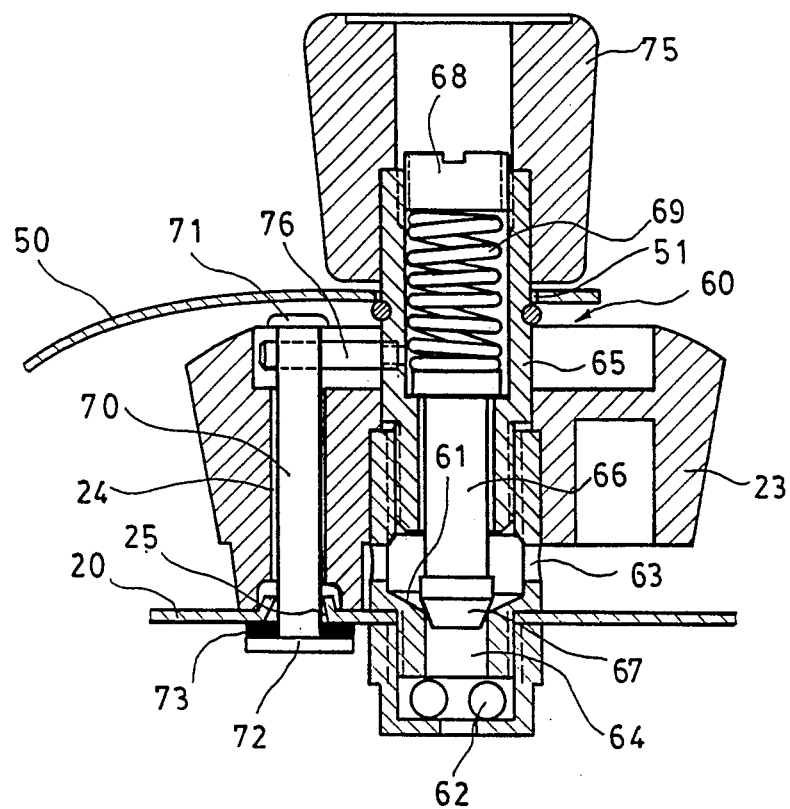
FIG. 3 is a sectional view of a relief valve and safety pins according to the present invention.

Please refer to FIGS. 1, 2, and 3, the present invention mainly comprises a cooker body 10 a cover 20, a C-connector 30, a grooved cam 40, an operating handle 50, a relief valve 60 and two safety pins 70. The cooker body 10 is for containing of food and has a lip 11 around its top. A flange 12 is installed on the lip 11. The cover 20 has a bent circumference 21 incorporated into which is a soft gasket 22, and a hollow handle 23 with interior screw threads on its top surface. The handle 23 is connected to a valve seat 61 (FIG. 3) with a plurality of ventilating holes 62 extending within the cooker and a plurality of relief holes 63 extending outside of the cooker and connected by an air passage to communicate the interior of the cooker with the atmosphere. The handle 23 has two openings 24 of which only one is shown and which each coincide with another opening 25 of the cover 20, each of them for insertion of a safety pin 70 into the cooker. The safety pins 70 can rise due a pressure in the cooker, and move lower whenever there is a reduction of the pressure in the cooker. Each safety pin 70 has a flange 71 at its upper end and another flange 72 at the lower end to restrict its stroke. A soft gasket 73 is put on the lower flange 72 to secure air-tightness by close contact with the inner wall of the cover 20 when pressure in the cooker is high.

Figure 5:
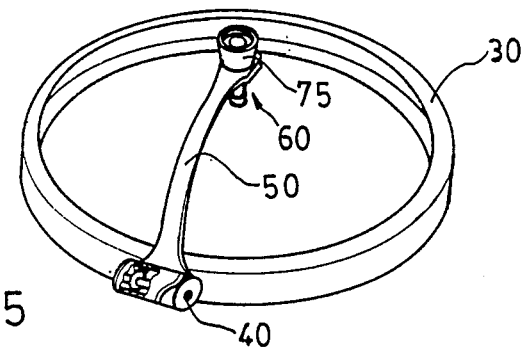
FIG. 5 illustrates upward moving of the operating handle in FIG. 4 to close the C-connector.
Figure 4A:
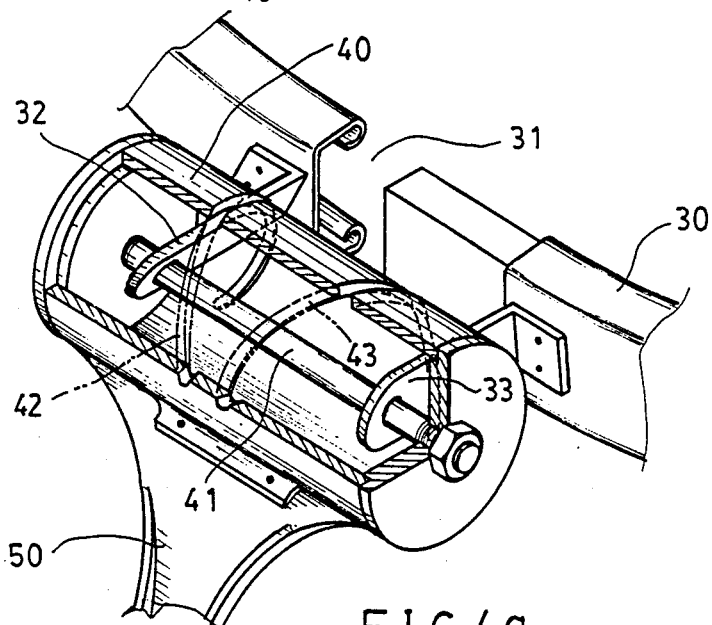
FIG. 4a is a magnified sectional view of the part within circle a in FIG. 4.
Figure 4:
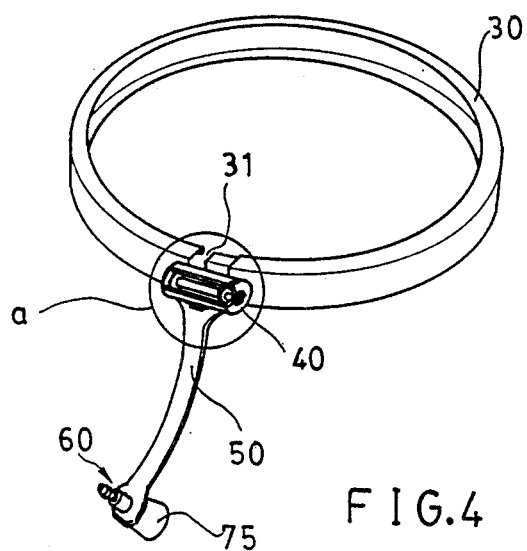
FIG. 4 illustrates loosening of the C-connector after removal from the cooker body.

With reference to FIGS. 4, 4a and 5, the C-Connector 30 is an elastic component which provides an opening 31 when it is in its loose condition. The width of the opening 31 is adjustable by turning the operating handle 50. Each end of the C-Connector 30 has a vertical extension plate 32 or 33 extending into a symmetrical spiral guiding slot 42 or 43 of the grooved cam 40. The grooved cam 40 has a center shaft 41 passing through the extension plates 32 and 33 which are secured with sliding fit at the center shaft 41.

The operating handle 50 is fixed to the grooved cam 40. Turning of the operating handle 50 can rotate the grooved cam 40. As shown in FIGS. 4 and 4a, when the operating handle 50 is turned and reaches the lowest level, the two extension plates 32 and 33 are separated by the guiding slots 42 and 43 so that the C-Connector 30 is loosened and provides the widest opening 31 for fastening between the lip 11 and the circumference 21 or for removing it from them. When the operating handle 50 is turned upward (FIG. 5), the two extension plates 32 and 33 approach each other due to the guiding slots 42 and 43 till the ends of the C-Connector 30 touch each other.

The operating handle 50 is flexible and can be bent slightly. It has a hole 51 for installation of a relief valve 60 at its free end. The relief valve 60 is freely rotatable within the hole 51 and has a moveable valve rod 66 (FIG. 3) subject to the downward thrust force of a compression spring 69 and is normally at the lowest position, partly extending outsite the valve body 65. The force of the compression spring 69 is adjustable by means of an adjusting nut 68 on the valve body 65. The valve body 65 is tightly fixed with a knob 75 on the top and a rod 76 at a side. The valve body 65 has male thread at the bottom for connecting to the handle 23.

Please refer to FIG. 2 again, for cooking food is first placed in the cooker body 10, and then the cover 20 is put on, and the C-Connector 30 is fixed over the lip 11 of the cooker body 10 and the circumference 21 of the cover 20. The operating handle 50 is turned upward till the ends of the C-Connector 30 touch each other in order to tightly fit the cover 20 to the cooker body 10. The relief valve 60 is then tightened in the hollow handle 23 of the cover 20 by manually applying 4-5 turns so that the tapered valve 67 at the lower end of the valve rod 66 firmly contacts the valve seat 61 to close the air passage 64. upon completing the above procedure, cooking can be started.

During cooking, pressure in the cooker will lift the safety pins 70 to the highest position, and the safety pins 70 will preclude any movement of the rod 76 at its highest position whenever there is an attempt to open the valve body 65 by children or improper operation. The valve body 65 can only be turned a certain extent (about 270°) but removal is impossible, and removal of the C-Connector 30 for opening the cover 20 is prevented to assure safe operation.

As soon as the pressure in the cooker reaches a certain limit, it overcome the thrust force of the compression spring 69 and pushes the tapered valve 67 to relieve air of high pressure through the holes 62 and 63 and the air passage 64 to the atomsphere. In case the ventilating holes 62 in the valve seat 61 are clogged e.g. by particles or oily dirt, the high pressure can open the C-Connector 30 and form a gap between the lip 11 of the cooker body 10 and the circumference 21 of the cover 20 to relieve air of high pressure so that the cooker is prevented from explosion due to excessive high pressure in it. Of course, whenever the ventilating holes 62 are clogged, the relief valve 60 can be opened partly (by turnign it for about 270°) so that the tapered valve 67 will contact the valve seat less tightly and the air passage 64 will be opened to relieve air of high pressure before overcoming the spring force, and foreigh particles in the air passage 64 will be forced out by the high pressure. The air passage 64 can be cleared with water or by blowing air through the relief holes 63.

After cooking, the valve body 65 is first turned for partly opening so that the pressure in the cooker can be relieved thought the open air passage 64. As soon as the pressure is lowered to a certain level or until there is no pressure in the cooker, the safety pins 70 are lowered and movement of the rod 76 will not be restricted by the safety pins 70. The relief valve 60 can be removed, and by pushing the operating handle 50 downward, the C-Connector 30 can be removed and the cover 20 can be removed consequently without the risk of injury due to air of high pressure and high temperature.

The above description and the attached drawings refer to an embodiment according to the present invention. Many a revision, alteration, addition and modification within the spirit and scope of the present invention may be done by any person skilled in the art. Therefore, the scope of patent claimed herein shall be limited by the claim stated below.

I claim:

1. A safety pressure cooker comprising:

a cooker body;

a cover for covering said cooker body;

an elastic connector, said connector having a C-shaped cross section, adapted to extend concentrically with respect to said cover, and said connector having a first terminus and a second terminus to define an opening which can be adjusted in width for fastening and releasing said cover;

an extension plate secured at each terminus to adjust the width of the opening for fastening and releasing said cover as aforesaid;

a grooved cam, said grooved cam having two symmetrical spiral guiding slots;

a center shaft passing through each extension plate of said connector and mounted with sliding fit so that rotation of said grooved cam will cause each extension plate to move subject to guiding by said two symmetrical spiral guiding slots to said grooved cam;

an operating handle connected to said grooved cam for turning said grooved cam, flexible, with a hole at one end;

a valve seat on said cover;

a relief valve movably installed in the hole of said operating handle, composed of (a) a valve body defining a valve seat, (b) a rod extending horizontally outside said valve body and including a tapered valve subject to thrust of a respective spring and normally contacting said valve seat for tightly closing said relief valve, and (c) a spring located in said valve body; and two safety pins on said cover, rising to a high position when pressure in the cooker is high in order to restrict movement of said rod of said relief valve such that removal of said tapered valve from said valve seat is substantially precluded and opening of said cover is prevented.

* * * * *